United States Patent [19]

Zeindler

[11] Patent Number: 5,534,013
[45] Date of Patent: Jul. 9, 1996

[54] PACIFIER THERMOMETER

[75] Inventor: Heidi Zeindler, Ebikon, Switzerland

[73] Assignee: Zewa AG, Switzerland

[21] Appl. No.: 331,089

[22] Filed: Oct. 28, 1994

[30] Foreign Application Priority Data

Apr. 6, 1994 [CH] Switzerland ................. 999/94

[51] Int. Cl.$^6$ ................. A61J 17/00; G01K 7/02
[52] U.S. Cl. ................. 606/234; 374/151
[58] Field of Search ............ 374/151; 606/234–236; D24/194–198

[56] References Cited

U.S. PATENT DOCUMENTS

| | | | |
|---|---|---|---|
| 3,117,450 | 1/1964 | Hoy | 374/151 |
| 5,013,160 | 5/1991 | Massey et al. | 374/151 |
| 5,176,704 | 1/1993 | Berndt | 374/151 |
| 5,178,466 | 1/1993 | Chiu | 374/151 |
| 5,186,047 | 2/1993 | Gordon et al. | 374/151 |

*Primary Examiner*—Stephen C. Pellegrino
*Assistant Examiner*—Glenn Dawson
*Attorney, Agent, or Firm*—Laurence R. Brown

[57] ABSTRACT

A pacifier thermometer (1) having a lip-shield (1'), a rubber nipple (2) projecting therefrom, a temperature sensor (6) and electronic measuring circuitry. The temperature sensor (6) is arranged on a metallic anchoring element (8) on the inner side of said nipple (2), the anchoring element (8) being connected through the nipple wall to a flat metalic counter-element (9) and thus fixedly held in the nipple wall (4') at a desired location. This construction warrants an optimized heat transfer from the tongue of a patient to the temperature sensor (6), so that the temperature can be quickly measured displayed and read.

5 Claims, 1 Drawing Sheet

PACIFIER THERMOMETER

TECHNICAL FIELD

The present invention relates to a pacifier thermometer having a lip-shield, a preferably hollow rubber nipple mounted in a central opening of the lip shield and projecting therefrom, a temperature sensor arranged inside of said nipple and an electronic device for storing, calculating and displaying the measured temperature values connected to said temperature sensor by electrical conductors passing through the nipple.

BACKGROUND ART

In known pacifier thermometers of the type as defined hereinabove the temperature sensor comprises a slender measuring probe extending to the front end of the nipple, where it may be held in a guiding element, e.g. as described in U.S. Pat. No. 5,178,466, or the sensor element proper is securely immersed in an encased liquid, e.g. as described in U.S. Pat. No. 5,021,060. In both cases the measuring sensor reacts in a relatively sluggish manner on the supplied heat (warming up the protective or transfer liquid, since the transfer to the measuring sensor needs a certain time, and the body temperature can not be transferred in a perfect manner). In an amended embodiment, the measuring sensor is arranged in a cavity in the inner wall of the nipple in order to reduce the distance to the heat source. However, practice has shown that the transfer of the temperature has not significantly improved.

DISCLOSURE OF THE INVENTION

It is therefore an object of the present invention to provide a pacifier thermometer capable of extraordinarily quick indication of the temperature to be measured. This is realized in a pacifier thermometer of the type as defined hereinabove and in accordance with the present invention in that the temperature sensor is arranged on a metallic anchoring element provided on the inner side of the nipple, whereby said anchoring element is connected through the wall of the nipple to a flat metallic counterelement mounted on the outer side of the nipple wall, said anchoring element and said counterelement being thus is affixed to the nipple wall.

The measuring sensor, preferably in the form of a thermistor, is encased between the anchoring element and said counterelement.

Due to the direct contact between the tongue and said metallic counterelement (contact plate), the body temperature to be determined will be transferred in a very short time period to said temperature sensor.

A particularly high efficiency is obtained with a pacifier having on the one hand a nipple with a flat neck corresponding to the normal position of the lips and on the other hand a flattened head section on the tongue side. This flattened head section, provided with said flat counterelement, is activated by direct contact of the tongue, thus leading to a perfect transfer of the temperature to be measured.

BRIEF DESCRIPTION OF THE DRAWINGS

The various features and advantages of the invention will become apparent from the following description with the accompanying drawing.

The drawing, showing a purely exemplary embodiment, shows.

DETAILED DESCRIPTION OF THE PREFERRED EMBODIMENT

Figure 1:
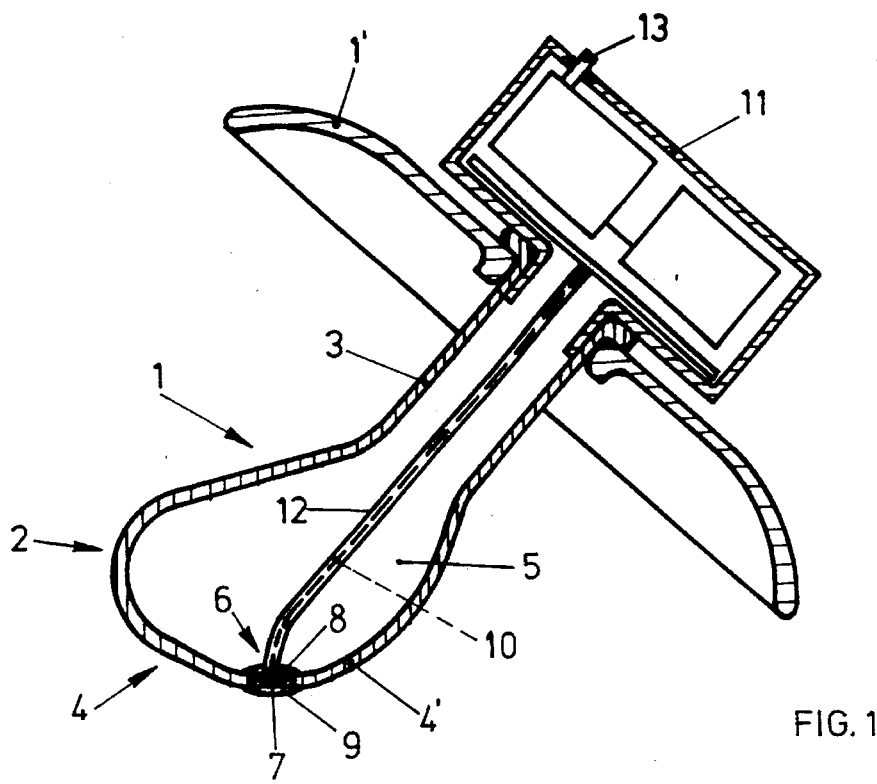
FIG. 1 a purely schematical longitudinal section through a pacifier thermometer in accordance with the invention.

The drawing shows in FIG. 1 a known type of pacifier 1 with a shield 1' and a rubber nipple 2 with a straight neck 3 (best adapted to the normal or natural position of the mouth) and a head 4 flattened in a lower section 4' (tongue side). This shape of a pacifier is particularly useful to assist the optimal formation of the teeth of babies.

As shown by FIG. 1 a temperature sensor 6 is lodged in the hollow space 5 of the rubber nipple 2. The measuring part proper of the sensor 6 is encased between a substantially flat metallic anchoring element 8 and its counterelement 9. The parts 8 and 9 form a kind of press button in which the temperature sensor 7 is encased.

The measurement part proper, i.e. the planar element 7, is preferably a thermistor and is connected via an electrical conductor 10 to an electronic temperature measuring circuitry lodged in a housing 11 for storing, evaluating and calculating desired values and for displaying the measured values.

The electrical conductor 10 is preferably embedded in a flexible carrier material (plastic tube 12).

Due to a contact zone of relatively large surface between the metalic counterelement 9, the temperature sensor 7 and the anchoring element 8 in the wall of the rubber nipple 2, the heat will be transferred considerably faster to the sensor 7 when compared with known devices.

The contact zone lies in a section of the rubber nipple 2 which is directly activated by the tongue, thus still increasing the efficiency.

The electronic measuring device lodged in housing 11 is activated or inactivated by means of switch 13. The housing 11 besides the electronic circuitry lodges also a display (screen) and the necessary battery (all generally known parts for building up thermometers of this type).

The use of appropriately constructed micro-chips in the electronic circuitry carries out the following program:

switch on/off reference measuring (operation control)

memorization of the last measure (if desired)

measuring range (e.g. 32°–42° C.)

optical signal and termination of measuring as soon as a measured value remains constant automatic storage automatic switching off of the device (e.g. after 10 minutes)

Figure 2:
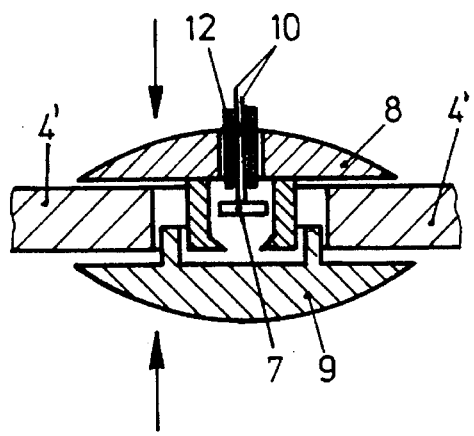
FIG. 2 an enlarged section through the temperature measuring means of the pacifier thermometer before its final clamping to the nipple wall, and FIG. 3 a view similar to FIG. 2 after clamping together said anchoring element and counterelement in the nipple wall.

FIG. 2 of the drawing illustrates a section (enlarged) through the means in the measuring zone, said means comprising a temperature sensor 7 encased between anchoring element 8 and counterelement 9, before the parts 8 and 9 are clamped together to the nipple wall by means of a suitable tool.

Figure 3:
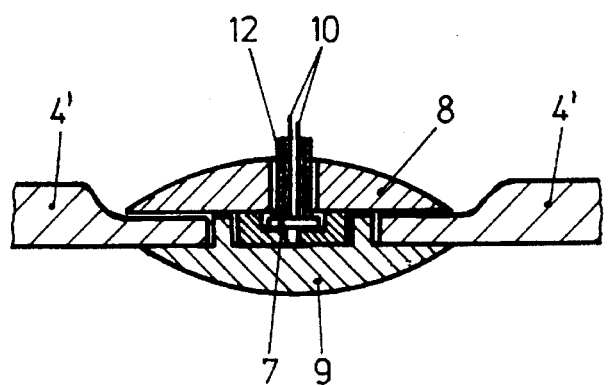

FIG. 3 shows a similar view as FIG. 2, but after the parts 8, 9 have been pressed together and clamped to the nipple wall.

Parts 8 and 9, but particularly part 9, are made of a metal with good heat conducting properties, such as e.g. yellow brass. Furthermore, part 9 may additionally be chrome-plated or silver-plated.

The construction in accordance with the present invention provides for an extraordinarily rapid transfer of the body temperature to be measured from the tongue over parts 8 and 9 to the measuring sensor 7.

I claim:

1. A pacifier thermometer of the type having a lip-shield, a rubber nipple mounted in a central opening of said lip-shield and projecting therefrom, a temperature sensor arranged inside of said nipple to measure temperature values and an electronic device for storing calculating and displaying the measured temperature values, said electronic device being connected to said temperature sensor by electrical conductors passing through said nipple, wherein the temperature sensor is arranged on a metallic anchoring element provided on the inner side of the nipple, said anchoring element being connected through the nipple wall to a flat metallic counterelement mounted on the outer side of the nipple wall, both said anchoring element and said counterelement being affixed together through the nipple wall.

2. A pacifier thermometer as defined in claim 1, wherein said temperature sensor is encased between the anchoring element and the counterelement.

3. A pacifier thermometer as defined in claim 1, wherein at least said counterelement is made of a metal having good heat transfer properties.

4. A pacifier thermometer as defined in claim 3, wherein said counterelement is made of chrome-plated yellow brass.

5. A pacifier thermometer as defined in claim 3, wherein said counterelement is made of silver-plated metal.

* * * * *